(12) United States Patent
Hargarten et al.

(10) Patent No.: US 8,271,585 B2
(45) Date of Patent: Sep. 18, 2012

(54) IDENTIFYING INTERMEDIARIES AND POTENTIAL CONTACTS BETWEEN ORGANIZATIONS

(75) Inventors: Christopher S. Hargarten, Seattle, WA (US); Ashvin J. Mathew, Kirkland, WA (US); Christopher P. Stine, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 12/703,740

(22) Filed: Feb. 10, 2010

(65) Prior Publication Data

US 2011/0196924 A1   Aug. 11, 2011

(51) Int. Cl.
*G06F 15/16* (2006.01)
(52) U.S. Cl. ........................... 709/204; 709/205
(58) Field of Classification Search .................. 709/203, 709/204, 205, 218, 220, 223, 224, 238, 239, 709/240
See application file for complete search history.

(56) References Cited

U.S. PATENT DOCUMENTS

| | | | |
|---|---|---|---|
| 6,078,892 A | 6/2000 | Anderson et al. | |
| 7,340,410 B1 | 3/2008 | Vaillancourt et al. | |
| 7,340,411 B2 | 3/2008 | Cook | |
| 7,366,759 B2 | 4/2008 | Trevithick et al. | |
| 2004/0128322 A1* | 7/2004 | Nagy | 707/104.1 |
| 2005/0171799 A1 | 8/2005 | Hull et al. | |
| 2005/0209914 A1 | 9/2005 | Nguyen et al. | |
| 2005/0276217 A1* | 12/2005 | Gadgil et al. | 370/225 |
| 2006/0067236 A1* | 3/2006 | Gupta | 370/238 |
| 2008/0104225 A1 | 5/2008 | Zhang et al. | |
| 2008/0140506 A1 | 6/2008 | Christianson et al. | |
| 2009/0037195 A1 | 2/2009 | Hoff | |
| 2009/0070435 A1 | 3/2009 | Abhyanker | |
| 2009/0313295 A1* | 12/2009 | Blaxland et al. | 707/103 R |
| 2010/0205037 A1* | 8/2010 | Besehanic | 705/10 |
| 2011/0196716 A1 | 8/2011 | Srinivasan et al. | |

OTHER PUBLICATIONS

"Argenta Systems, Inc.—Reporting, Back Office Integration & Extended Solutions," © 2008 Argenta Systems, Inc.
"Demand Generation & Lead Management," Canterris—leading provider of on demand marketing solutions, © Copyright 2008 Canterris Inc., http://www.canterris.com/Demand_Generation.
"Microsoft Dynamics CRM Online Delivers Mar. 2009 Service Update," Mar. 10, 2009, Microsoft Press-Pass Information for Journalists.
"No matter how beautiful, dramatic of interesting your website is, if no one can find your website it will not be a profitable website," Michael's Uniforms & Webs, Internet Lead Generation, http://www.bringingbuyers.com/index.htm [last accessed Feb. 10, 2010].

(Continued)

*Primary Examiner* — Barbara Burgess
(74) *Attorney, Agent, or Firm* — Perkins Coie LLP

(57) ABSTRACT

A contact identification system provides a network of members with each member of a network having a relationship with one or more other members of the network. The contact identification system identifies relationship paths between a first member of a first network and a second member of a second network by traversing relationships to identify relationship paths that include a common member that is common to both the first network and the second network. The contact identification system generates an intermediary score for each identified relationship path to indicate whether the identified relationship path includes an intermediary who can effect a successful introduction between the first member and the second member. The contact identification system then identifies as potential intermediaries the common members based on generated intermediary scores.

20 Claims, 11 Drawing Sheets

OTHER PUBLICATIONS

"Social Network," Wikipedia, the free encyclopedia, Apr. 10, 2009, http://en.wikipedia.org/wiki/Social_network.

"What is ValueCRM," © 2002-2007 Cyberindigo Net Private Limited, http://www.cyberindigo.net/products/valueCRM.htm.

Your Best Leads are Hot Leads Don't Let Yours Get Cold!, The LeadSaver System, Registration Technology, Inc., http://www.americanpetproducts.org/ , © 1998-2010 American Pet Products Association, Inc.

Bruderl, Josef and Peter Preisendorfer, "Network Support and the Success of Newly Founded Businesses," Small Business Economics, vol. 10, pp. 213-225, 1998, © 1998 Kluwer Academic Publishers.

Culotta, Aron et al., "Extracting social networks and contact information from email and the Web," in Proceedings of CEAS 2004, © 2004 American Association for Artificial Intelligence.

Jones, Michael, "Leveraging Social Networking Sites to Generate Business," © 2009 About.com, Inc. http://entrepreneurs.about.com/od/onlinenetworking/a/socnetsites.htm.

Swearingen, Jake, "Four Ways Social Networking Can Build Business," BNET, © 2010 CBS Interactive Inc., http://www.bnet.com/2403-13070_23-219914.html.

Whiting, Rick, "Microsoft Adds Sales Incentives, Tools for Dynamics Apps Resellers," ChannelWeb, Mar. 10, 2009, http://www.crn.com/software/215801664.

* cited by examiner

IDENTIFYING INTERMEDIARIES AND POTENTIAL CONTACTS BETWEEN ORGANIZATIONS

BACKGROUND

Enterprise Resource Planning ("ERP") software is a type of software used by many organizations to plan and manage various business functions, such as budgeting, accounting, human resources, inventory, customer relationships, sales, and so on. ERP software typically provides access to a database from which users and applications may retrieve information related to the various business functions. The database may contain a wealth of information about the organization and its customers. For example, the database may include a customer table that contains a comprehensive list of all the customers along with detailed information about each customer. The detailed information may include contact information, customer addresses, customer industry codes, names of principals of the customers, relationships with members of the organization and the principals, and so on. As another example, the database may include a sales history table that provides a record for each sale made to a customer along with sales details such as product identifier, quantity, price, sale date, and so on.

A sales organization, such as a company selling a product, can increase its sales by making additional sales to its current customers or by expanding its customer base to new customers. Traditionally, sales organizations identify potential customers, also referred to as "leads," in various ways. For example, a sales organization may sponsor a booth at a trade show and develop leads based on discussions with attendees or business cards provided by attendees. As another example, a sales organization can develop leads using advertisements that describe their products and provide telephone numbers that a potential customer can call to obtain additional information. The World Wide Web has provided additional opportunities for sales organizations to expand their customer base. A sales organization may provide a web site through which potential customers can access information on products being offered for sale. The web site may provide very detailed information about the products including product specifications, video typically provides an information request web page through which a potential customer can register to receive additional information about the products. The information request web page may prompt the user to provide their name, their title, the company they represent, their electronic mail address, their telephone number, and so on and may allow the user to request additional product information, ask to talk to a salesperson, and so on.

A sales organization may also attempt to identify leads based on contacts with a potential customer. For example, a sales organization may identify an employee of the potential customer who has the authority to make a purchasing decision for a product being sold by the sales organization. Once the employee is identified, the sales organization needs to determine the best way to contact that employee. Clearly, if a person within the sales organization already has a relationship with that employee (e.g., they are friends, attend the same church, or are alumni of the same university), then that person may be a good candidate to make the initial contact with the identified employee. When the company of the sales organization and the potential customer both have hundreds or thousands of employees, it can be virtually impossible for the sales organization to identify the correct employee of the potential customer or to determine who within their company might have a relationship with the identified employee or another employee of the organization that could assist in making an initial contact.

Many organizations face similar problems when they are trying to increase their membership. For example, a company may want to identify all the persons that the company may want to hire, a charitable organization may want to identify potential contributors, a political organization may want to identify potential members, and so on. In addition to identifying potential members, these organizations would also like to identify persons with appropriate relationships with the potential members who could assist in making a successful introduction to the potential members.

SUMMARY

A system and method for identifying an intermediary for a relationship contact between a first member of a first network and a second member of a second network is provided. A contact identification system provides a first network of members with each member of the first network having a relationship with one or more other members of the first network and having attributes. The first network is represented as a first graph with nodes and links. Each member of the first network is represented as a node, and the relationships are represented as links between nodes. The contact identification system also provides a second network of members with each member of the second network having a relationship with one or more other members of the second network and having attributes. The second network is represented as a second graph with nodes and links. Each member of the second network is represented as a node, and the relationships are represented as links between nodes. The contact identification system identifies relationship paths between the first member of the first network and the second member of the second network by traversing the first graph and the second graph to identify paths that include a common member that is common to both the first network and the second network. The common member serves as a bridge between the first network and the second network. The contact identification system generates an intermediary score for each identified relationship path. The intermediary score is derived from relationship scores for each link along an identified relationship path and the length of the relationship path. The relationship scores for a link are based on the attributes of the members connected by the link. The intermediary score indicates whether the identified relationship path includes an intermediary who can effect a successful introduction between the first member and the second member. The contact identification system then identifies as potential intermediaries the common members that serve as the bridge for the relationship paths whose generated intermediary scores indicate they can effect a successful introduction between the first member and the second member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
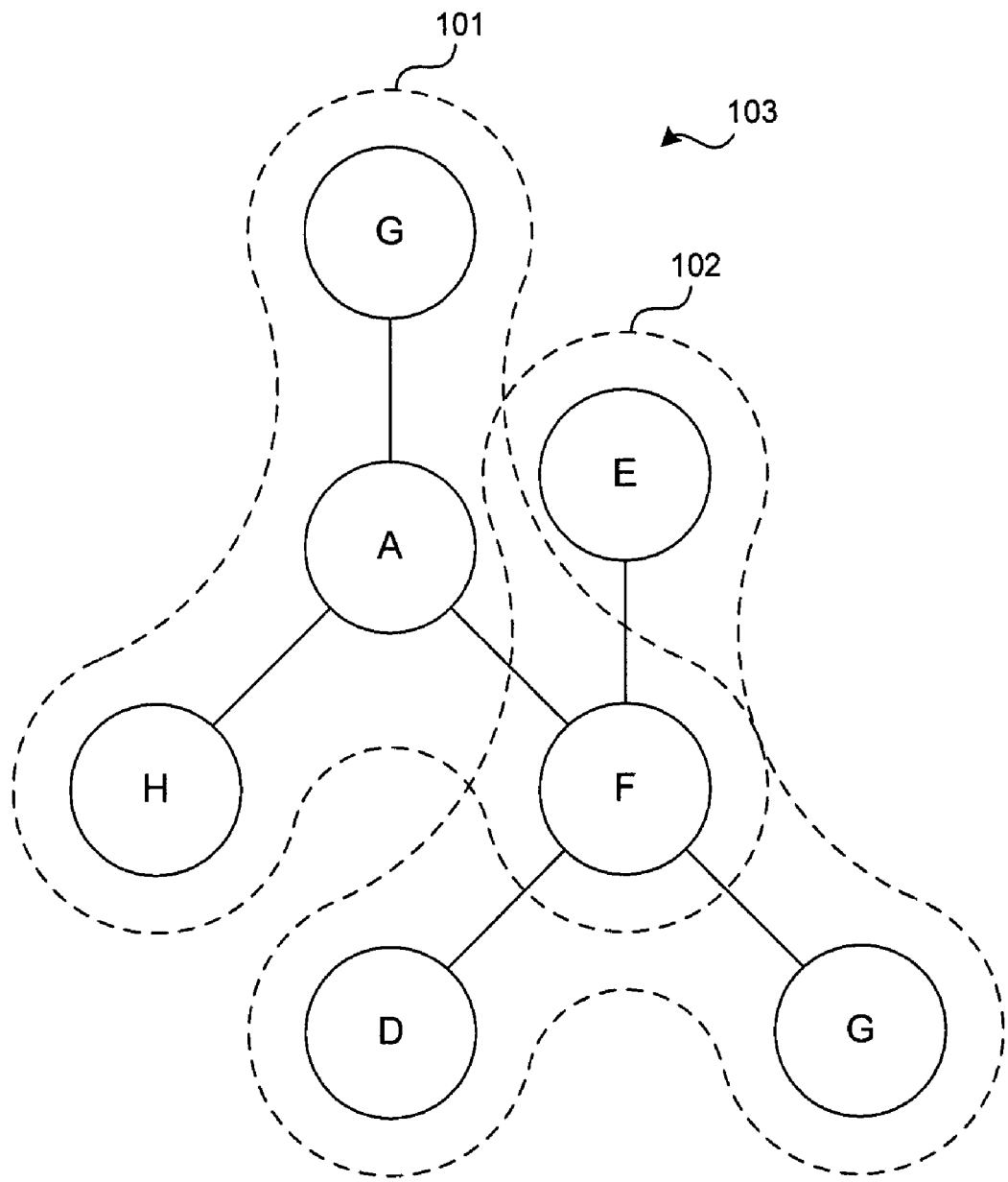
FIG. 1 illustrates two different networks and the relationship paths between the members of the networks.

A method and system for identifying an intermediary to assist in making a contact between a member of the first organization and a member of a second organization is provided. In some embodiments, the contact identification system analyzes contact information of the first organization and contact information of the second organization to identify an appropriate intermediary. The contact information may be derived from databases of an ERP system, contact lists of members of the organizations, social networks, alumni rosters, and so on. The contact information for the first organization may be represented by a first network of members. The members of the first network may include the members of the organization and contacts of those members. For example, the members of the first network may include members of the first organization and each contact that is in a contact list of a member of the first organization. Similarly, contact information for the second organization may be represented by a second network of members. To identify an appropriate intermediary between a first member of the first organization and a second member of the second organization, the contact identification system identifies relationship paths between the first member and the second member as indicated by the first and second networks. A relationship path between the first member and the second member includes a common member from both networks that serves as a bridge between the networks. For example, if the first member is a sales representative of the first organization and the second member is a purchasing agent of the second organization, then the sales representative may have a relationship with a vice president of the first organization who has a social relationship (e.g., as indicated by a entry in the vice president's contact list) with a vice president of the second organization. The vice president of the second organization may have a relationship with the purchasing agent. The relationship path would be from the sales representative to the vice president of the first organization to the vice president of the second organization to the purchasing agent. The vice president of the second organization is a common member of both the first network and the second network. That vice president is a member of the first network because that vice president is included in a contact list of the vice president of the first organization, and that vice president is a member of the second network because that vice president is an employee of the second organization. The identification of relationship paths based on a common member of different networks can be used to help identify an appropriate intermediary who can assist in making a successful introduction between the first member and the second member.

In some embodiments, a contact identification system generates an intermediary score for the identified relationship paths as an indication of whether an intermediary, such as a common member of the relationship path, could assist in effecting a successful introduction. For example, the chances of a common member of the relationship path assisting in a successful introduction may be greater if the common member is a vice president rather than a part-time mailroom clerk. As another example, the chances of the common member assisting in a successful introduction may be greater if the relationship path includes three members rather than eight members. The contact identification system may thus generate the intermediary score based on various attributes of the members along the relationship path (e.g., position and location), the length of the relationship path, and so on. The contact identification system may generate an intermediary relationship score for each relationship along an identified relationship path. The contact identification system may then aggregate the intermediary relationship scores into an intermediary score for the relationship path. Once the contact identification system has generated the intermediary scores, the contact identification system may identify potential intermediaries from the common members of the relationship paths with intermediary scores indicating a favorable chance of having an intermediary who can assist in making a successful introduction between the first member and the second member.

In some embodiments, the contact identification system may be used to identify potential contacts of interest for a first organization. The contact identification system may start with a first member of the first organization and identify relationship paths to multiple second members of a second organization using the first and second networks. As discussed above, these relationship paths include common members with one common member serving as a bridge between the first network and the second network. To assist in identifying a potential contact, the contact identification system generates a potential contact score for each identified relationship path. A potential contact score indicates the likelihood that the second member at the end of the identified relationship path would be a contact of interest to the first member or the first organization. The potential contact score may factor in the intermediary score for the relationship path along with other attributes that may be particularly pertinent to potential contacts of interest. For example, if the first organization is a charitable organization, then an attribute indicating that a second member has previously contributed to that charitable organization may indicate that the second member is more likely a good candidate to be on the board of directors of the charitable organization than a second member who has made no such contribution. Once the contact identification system generates the potential contact scores, the contact identification system may present the second members at the end of the relationship paths with the highest potential contact scores as potential contacts of interest. The contact identification system may also suggest an intermediary based on an intermediary score of the identified relationship path.

In some embodiments, the contact identification system may provide a variety of algorithms that may be used to generate the various scores for the identified relationship paths. Each algorithm may be tailored to achieving a specific goal such as identifying potential contacts for employment, potential contacts as volunteers for an organization, intermediaries for a sales pitch, and so on. The contact identification system may also allow each organization to customize or provide its own scoring algorithms. Different organizations may want to weight attributes of the members in different ways. For example, a charitable organization may want to weight past charitable contributions higher than a company searching for a new director of human resources.

FIG. 1 illustrates two different networks and the relationship paths between the members of the networks. Graph 101 illustrates a first network with members A, F, G, and H with a node for each member and a link representing the relationship between members. In this example, member A has a direct relationship with members F, G, and H as represented by the links between the corresponding nodes. However, members F, G, and H do not have direct relationships to each other as represented by the absence of links between the corresponding nodes. Graph 102 illustrates a second network with members D, E, F, and G also with nodes and links. Graph 103 illustrates an overlay of the networks based on a common member. In this example, member F is a common member between the first and second networks and can serve as a bridge for relationship paths between the first and second networks. For example, if member H of the first network would like to be introduced to member D of the second network, then the contact identification system would identify the relationship path of H-A-F-D. Given this relationship path, member F may be in a good position to introduce member H to member D. Member G is also a common member between the networks, and another relationship path between member H and member D may be H-A-G-F-D. Since this relationship path is longer, it may have a lower intermediary score than the shorter path that does not go through member G. However, if member G happens to have a very high position in one of the organizations represented by the networks, then the intermediary score of the longer path might be higher than the intermediary score the shorter path.

Figure 2:
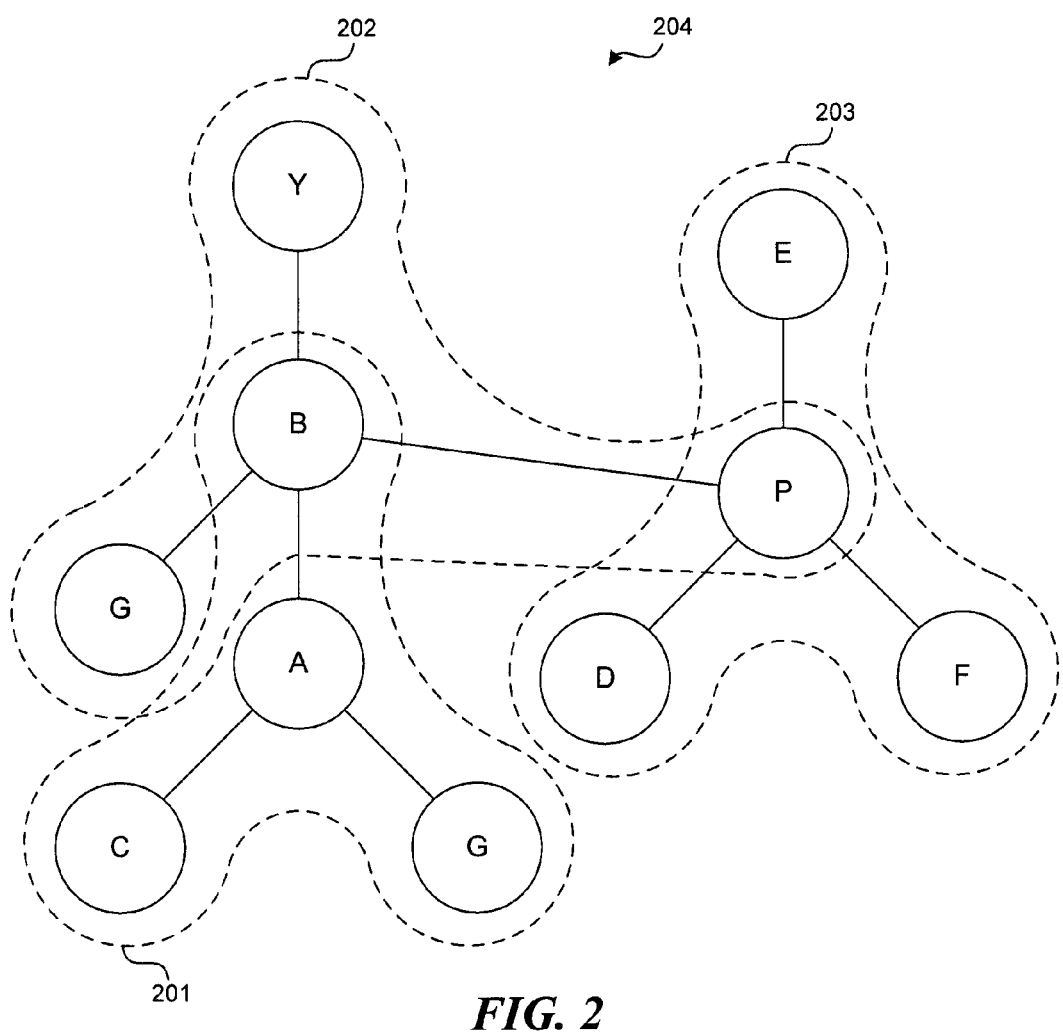
FIG. 2 illustrates three different networks and the relationship paths between the members of the networks.

FIG. 2 illustrates three different networks and the relationship paths between the members of the networks. Graph 201 illustrates a first network with members A, B, C, and G. Graph 202 illustrates a second network with members B, G, P, and Y. Graph 203 illustrates a third network with members D, E, F, and P. Graph 204 illustrates an overlay of the networks based on common members. In this example, member B is a common member between the first network and the second network and can serve as a bridge for relationship paths between the first and second networks. Also, member P is a common member between the second network and third network and can serve as a bridge for relationship paths between the second and third networks. By using common members B and P, a relationship path can be identified between a member of the first network and a member of the third network. For example, the relationship path A-B-P-D from member A in the first network to member D in the third network can exist even though the first network and the third network have no members in common. The contact identification may be used with any number of networks by overlaying the networks based on their common members.

Figure 3:
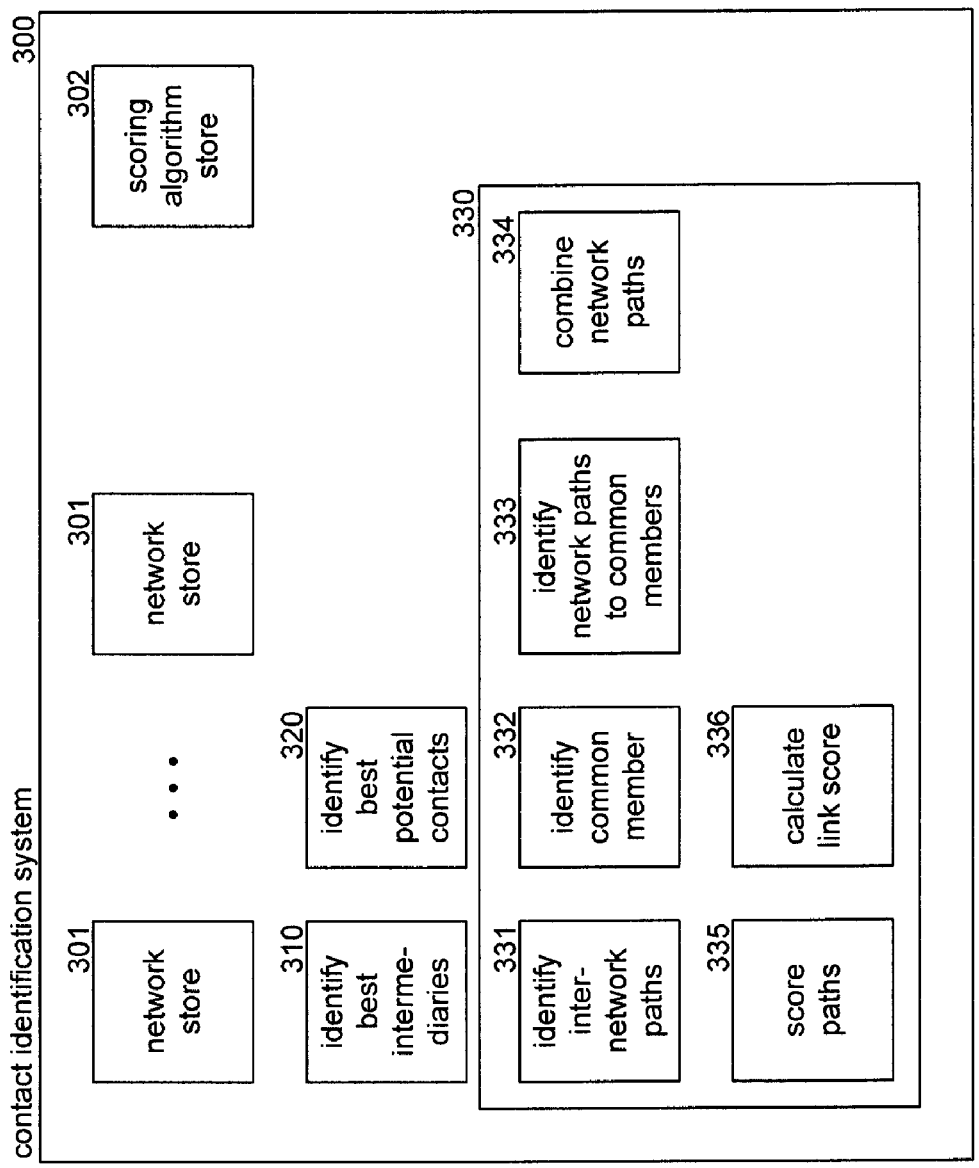
FIG. 3 is a block diagram that illustrates components of the contact identification system in some embodiments.

FIG. 3 is a block diagram that illustrates components of the contact identification system in some embodiments. The contact identification system 300 includes network stores 301, a scoring algorithm store 302, an identify best intermediaries component 310, an identify best potential contacts component 320, and auxiliary components 330. Each network store contains information describing a network. A network may be represented as a matrix with a row and a column for each node, with each element of the matrix indicating whether the nodes for the corresponding row and column have a link or relationship. In addition, a network store may contain the attributes of each node. The contact identification system may populate the network stores from contact lists, business databases, social networks, and so on. The scoring algorithm store may contain various scoring algorithms used in identifying an intermediary and a potential contact. Each scoring algorithm may be adapted to generating a score relating to achieving a particular goal. For example, a scoring algorithm for identifying a potential board member for a political organization may factor in the political affiliation of the members, whereas a scoring algorithm for identifying an employee for a business may disregard political affiliation. The identify best intermediaries component is provided with a member of the first network and a member of a second network and identifies possible intermediaries to serve as contacts between the members. The identify best potential contacts component is provided with a member of the first network and members of the second network and identifies which members of the second network are potential contacts. Both the identify best intermediaries component and the identify best potential contacts component may be provided with a scoring algorithm or criterion for scoring the intermediaries and potential contacts.

The auxiliary components include an identify inter-network paths component 331, an identify common member component 332, an identify network paths to common members component 333, a combine network paths component 334, a score paths component 335, and a calculate link (relationship) score component 336. The identify inter-network paths component is provided a member of a first network and a member of the second network and identifies relationship paths between the members. The identify common members component is provided two networks and identifies the common members between the networks. The identify network paths to common members component is provided a member and a network and identifies paths between the member and the common members of that network. The combine network paths component is provided with network paths to common members for a first network and network paths to common members for a second network and combines the network paths of the first network and the second network to generate inter-network paths. The score paths component scores relationship paths network paths based on a criterion or scoring algorithm. The calculate link score component calculates a relationship score between two directly linked members in a relationship path.

Table 1 illustrates possible attributes that may be used when generating intermediary scores and potential contact scores.

Name
Current role
Organization
Industry
Address
Phone
Email
City of residence
State
Travel updates
Associations/member of
Previous roles
Previous companies
Next travel date
Attending conferences/summits Business interests
Social interests
Frequency of interactions
Source of contact
Probability of response for requests
Is on vacation
Number of network connections
Alumni associations
Web site
Groups
Specialties
Best contact medium (email/phone)

The computing device on which the contact identification system may be implemented may include a central processing unit, memory, input devices (e.g., keyboard and pointing devices), output devices (e.g., display devices), and storage devices (e.g., disk drives). The memory and storage devices are computer-readable storage media that may contain instructions that implement the contact identification system. In addition, the data structures and message structures may be transmitted via a data transmission medium, such as a signal on a communications link. Various communications links may be used, such as the Internet, a local area network, a wide area network, or a point-to-point dial-up connection.

The contact identification system may be implemented in and/or used by various operating environments. The operating environment described herein is only one example of a suitable operating environment and is not intended to suggest any limitation as to the scope of use or functionality of the contact identification system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The contact identification system may be described in the general context of computer-executable instructions, such as program modules, stored in a storage device and executed by one or more computers or other devices. Generally, program modules include routines, programs, objects, components, data structures, etc., that perform particular tasks or implement particular abstract data types. Typically, the functionality of the program modules may be combined or distributed as desired in various embodiments. One skilled in the art will appreciate that the flow diagrams illustrated below are provided to describe the overall functionality of the contact identification system. The overall functionality can be provided using different algorithms. For example, when identifying common members, the identification process may be facilitated by sorting the lists initially. Also, functions described as being recursive may be implemented non-recursively.

Figure 4:
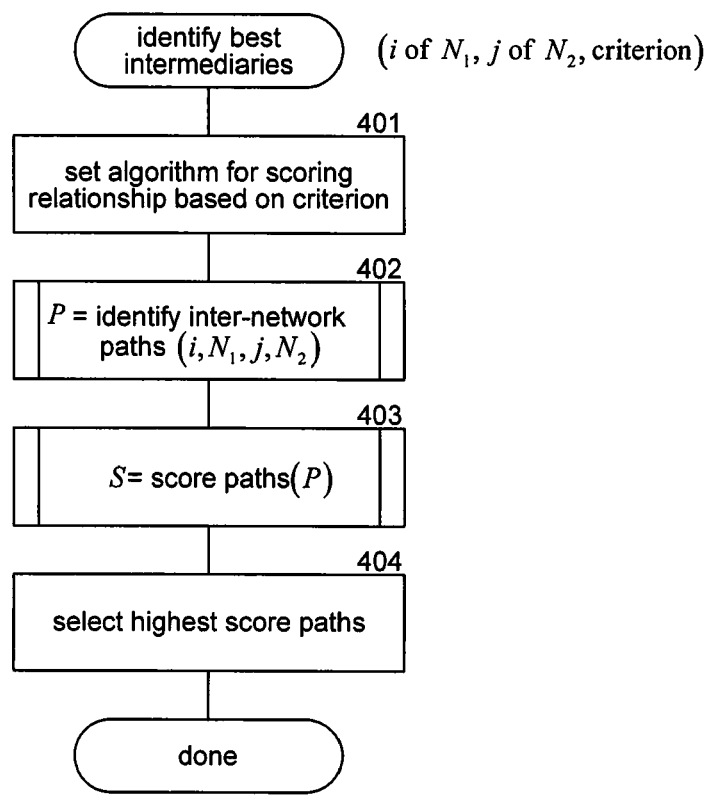
FIG. 4 is a flow diagram illustrating the processing of an identify best intermediaries component in some embodiments.

FIG. 4 is a flow diagram illustrating the processing of an identify best intermediaries component in some embodiments. The component is passed an indication of a member of a first network, an indication of a member of a second network, and a scoring criterion. The component identifies potential intermediaries between the member of the first network and the member of the second network. In block 401, the component sets a scoring algorithm for scoring the relationships based on the criterion. In block 402, the component invokes the identify inter-network paths component to identify relationship paths between the member of the first network and the member of the second network. In block 403, the component invokes the score paths component to score each of the relationship paths between the member of the first network and the member of the second network. In block 404, the component selects the relationship paths with the highest scores as sources of intermediaries between the member of the first network and the member of the second network. The candidate intermediaries may be any common members on a relationship path and, in particular, common members that serve to bridge the networks along the relationship path. The component then completes.

Figure 5:
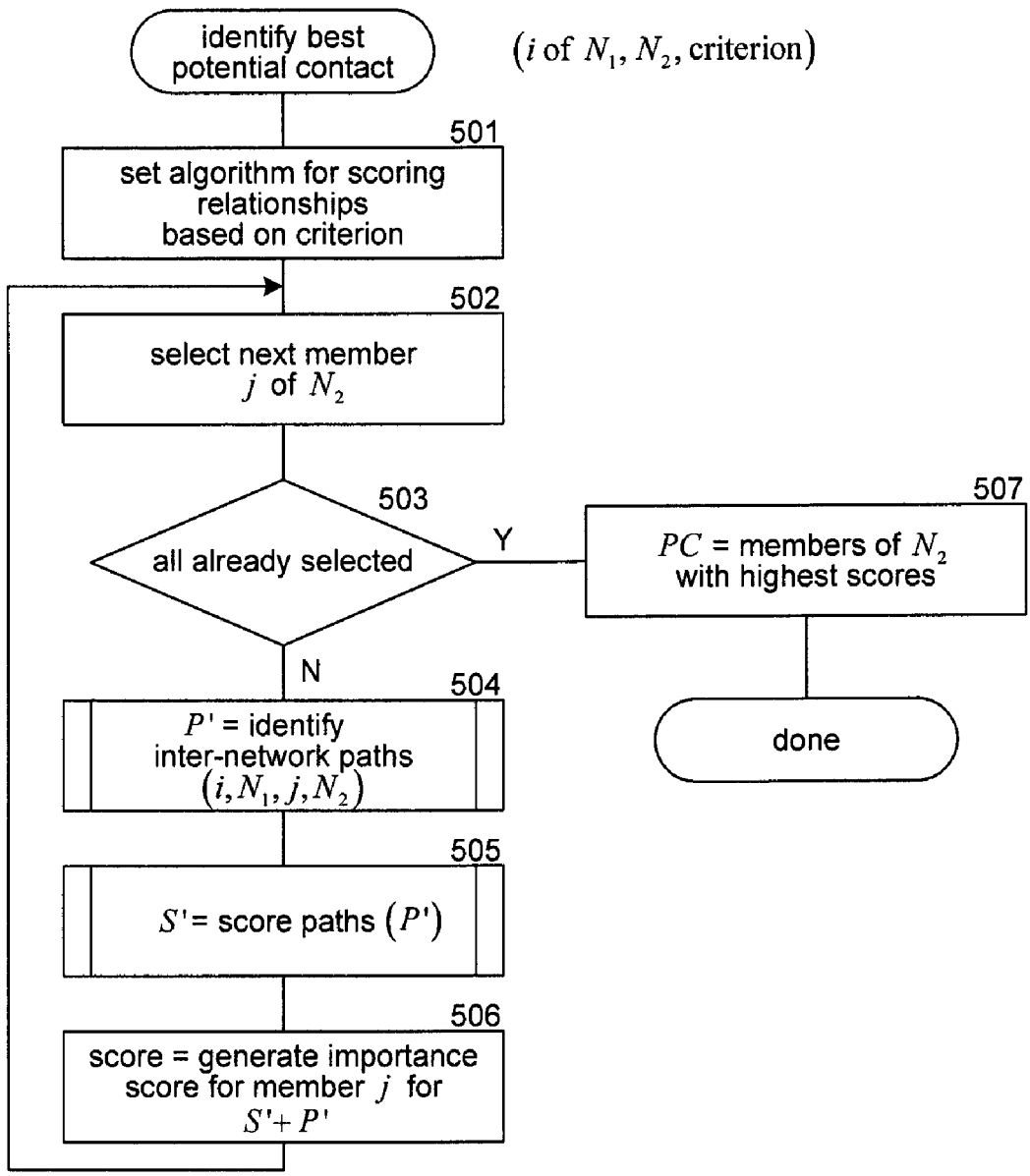
FIG. 5 is a flow diagram that illustrates the processing of an identify best potential contacts component in some embodiments.

FIG. 5 is a flow diagram that illustrates the processing of an identify best potential contacts component in some embodiments. The component is passed an indication of a member of the first network, an indication of the second network, and a scoring criterion. The component identifies members of the second network that may be good potential contacts for the member of the first network based on the scoring criterion. In block 501, the component sets a scoring algorithm for scoring relationships based on the scoring criterion. In blocks 502-506, the component loops selecting each member of the second network and generating a potential contact score for that member. In block 502, the component selects the next member of the second network. In decision block 503, if all the members of the second network have already been selected, then the component continues at block 507, else the component continues at block 504. In block 504, the component invokes the identify inter-network paths component, passing an indication of the member of the first network and the selected member of the second network, and receives an indication of the relationship paths between the members. In block 505, the component invokes the score paths component to generate scores for the relationship paths. In block 506, the component generates a potential contact score for the selected member of the second network by combining the scores for the relationship paths. The component may use various algorithms for combining the scores such as an average score of the paths, the highest score of the paths, the median of the scores, the mode of the scores, and so on. The component then loops to block 502 to select the next member of the second network. In block 507, the component identifies potential contacts as the members of the second network with the highest scores. The component then completes.

Figure 6:
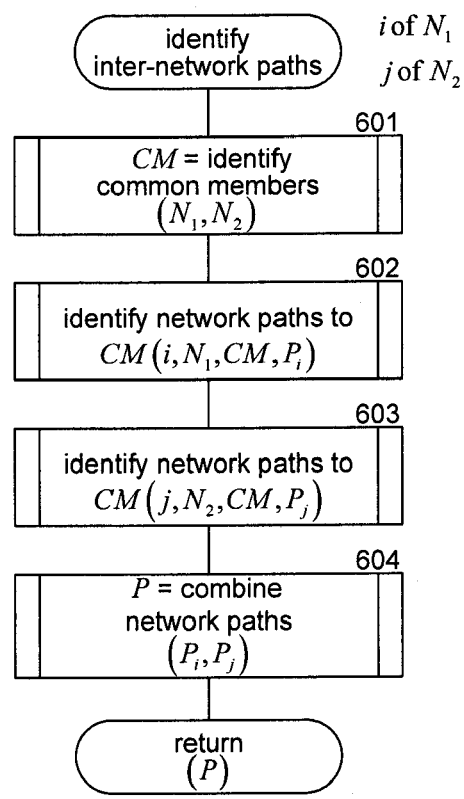
FIG. 6 is a flow diagram that illustrates the processing of an identify inter-network paths component in some embodiments.

FIG. 6 is a flow diagram that illustrates the processing of an identify inter-network paths component in some embodiments. The component is passed an indication of a member of a first network and an indication of a member of the second network. The component returns an indication of the relationship paths between the members. In block 601, the component invokes the identify common members component passing an indication of the networks to identify the common members between the networks. In block 602, the component invokes the identify network paths to common members component, passing an indication of the member of the first network, the first network, and common members, and receives an indication of the paths within the first network from the member to each common member. In block 603, the component invokes the identify network paths to common members component, passing an indication of the member of the second network, the second network, and the common members, and receives an indication of the paths within the first network from that member to each common member. In block 604, the component invokes the combine network paths component, passing an indication of the paths within the first network, and the second network, and receives an indication of the combined paths. The component then returns the combined paths.

Figure 7:
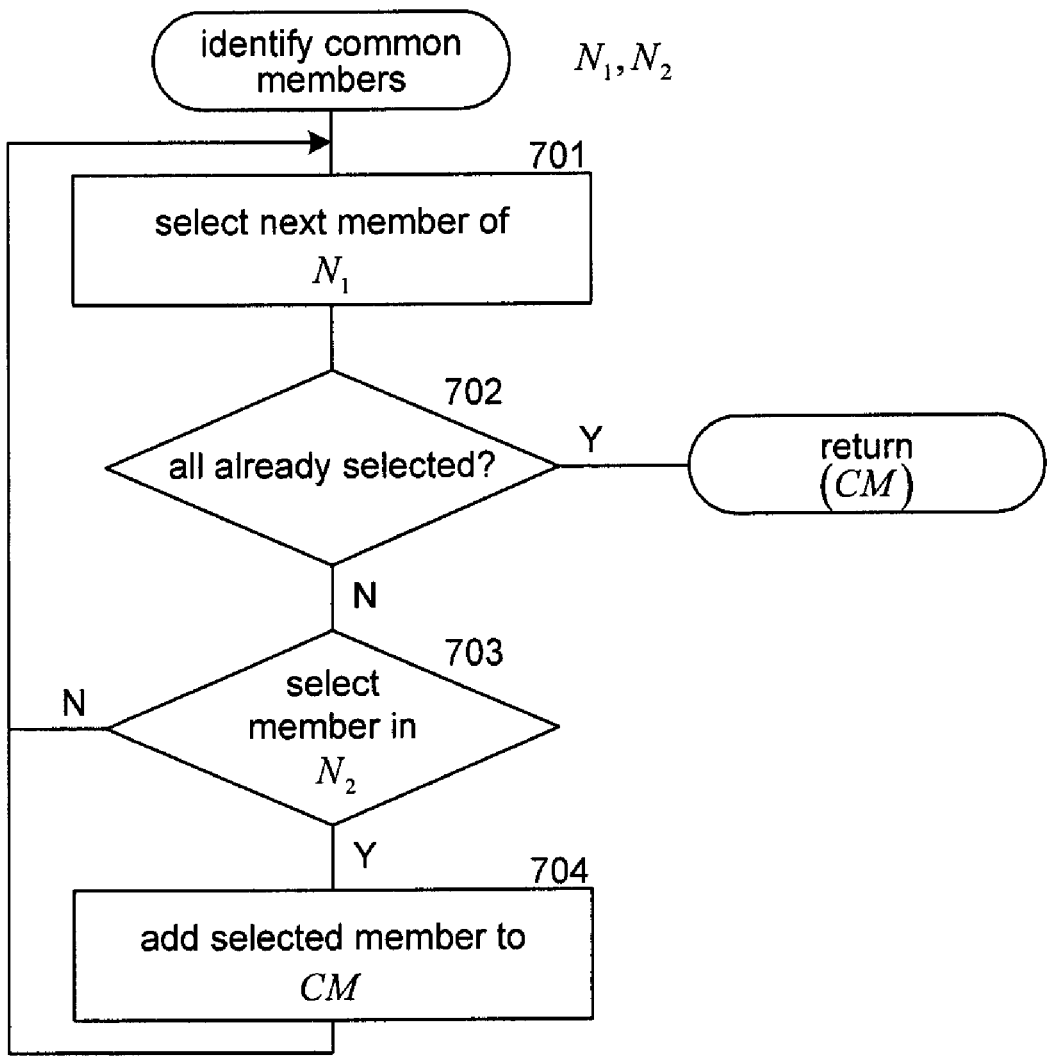
FIG. 7 is a flow diagram that illustrates the processing of an identify common members component in some embodiments.

FIG. 7 is a flow diagram that illustrates the processing of an identify common members component in some embodiments. The component is passed an indication of a first network and a second network and returns an indication of the members that are common to both networks. In block 701, the component selects the next member of the first network. In decision block 702, if all the members of the first network have already been selected, then the component returns an indication of the identified common members, else the component continues at block 703. In decision block 703, if the selected member of the first network is also in the second network, then the component continues at block 704, else the component loops to block 701 to select the next member of the first network. In block 704, the component adds the selected member to a list of identified common members and then loops to block 701 to select the next member of the first network.

Figure 8:
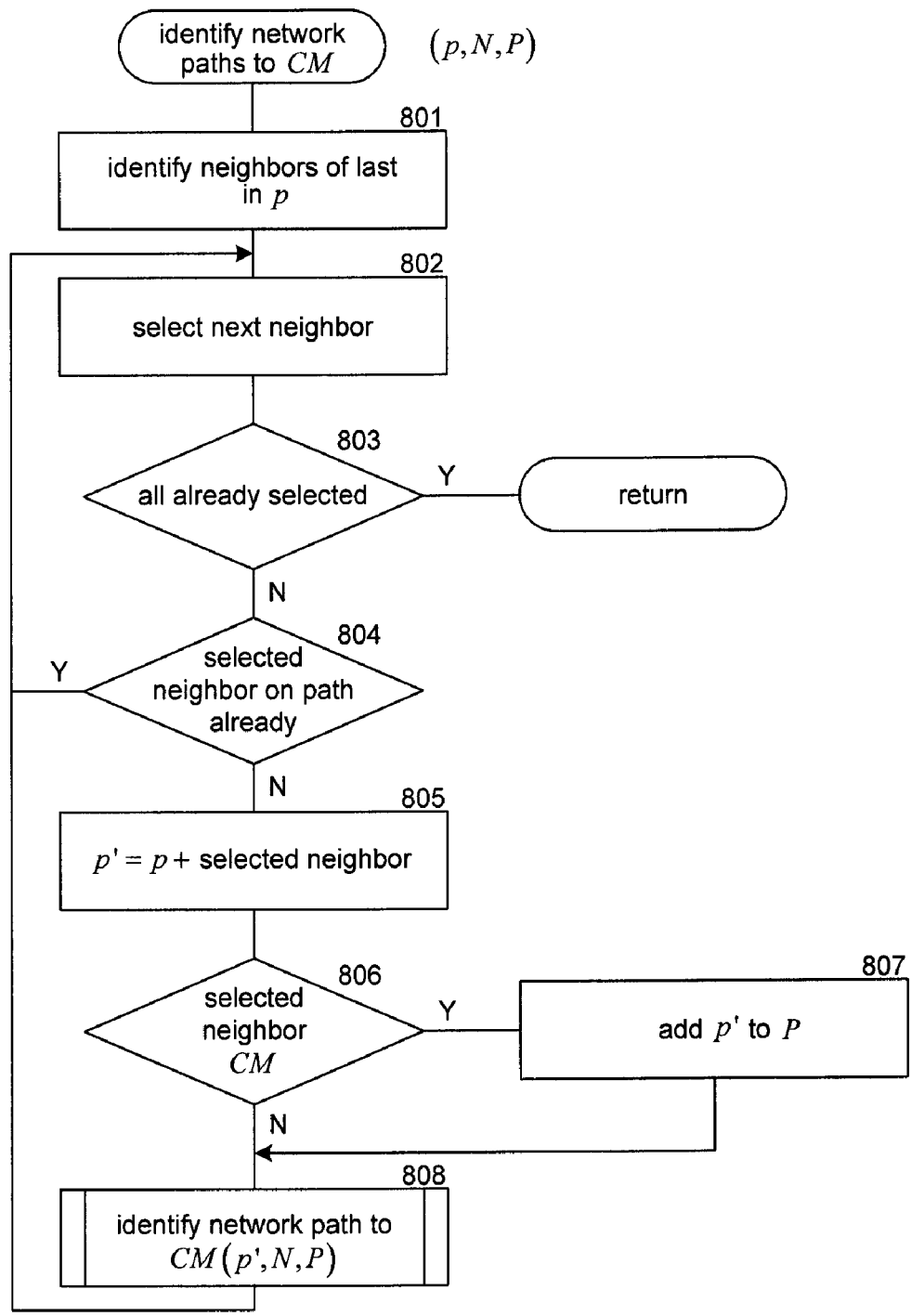
FIG. 8 is a flow diagram that illustrates the processing of an identify network paths to common members component in some embodiments.

FIG. 8 is a flow diagram that illustrates the processing of an identify network paths to common members component in some embodiments. The component is passed an indication of a partial path, a network, and paths to common members that have been identified so far. The component is recursively invoked to traverse a graph representing the network to identify paths from a member of the network to the common members. The partial path is initialized with that member of the network when the component is initially invoked. In block 801, the component identifies the neighbors of the last member in the partial path. Neighbors are connected by a direct link. In blocks 802-808, the component loops selecting each neighbor and recursively invoking the identify network paths to common members component to identify neighbors of neighbors to be added to the path. In block 802, the component selects the next neighbor. In decision block 803, if all the neighbors have already been selected, then the component returns, else the component continues at block 804. In decision block 804, if the selected neighbor is already on the path, then the component loops to block 802 to select the next neighbor, else the component continues at block 805. In block 805, the component adds the selected neighbor to the partial path. In decision block 806, if the selected neighbor is a common member, then the component continues at bock 807, where it adds the partial path to the collection of paths. The component then continues at block 808. In block 808, the component recursively invokes the identify network paths to common members component passing an indication of the partial path, the network, and a collection of paths. The component then loops to block 802 to select the next neighbor.

Figure 9:
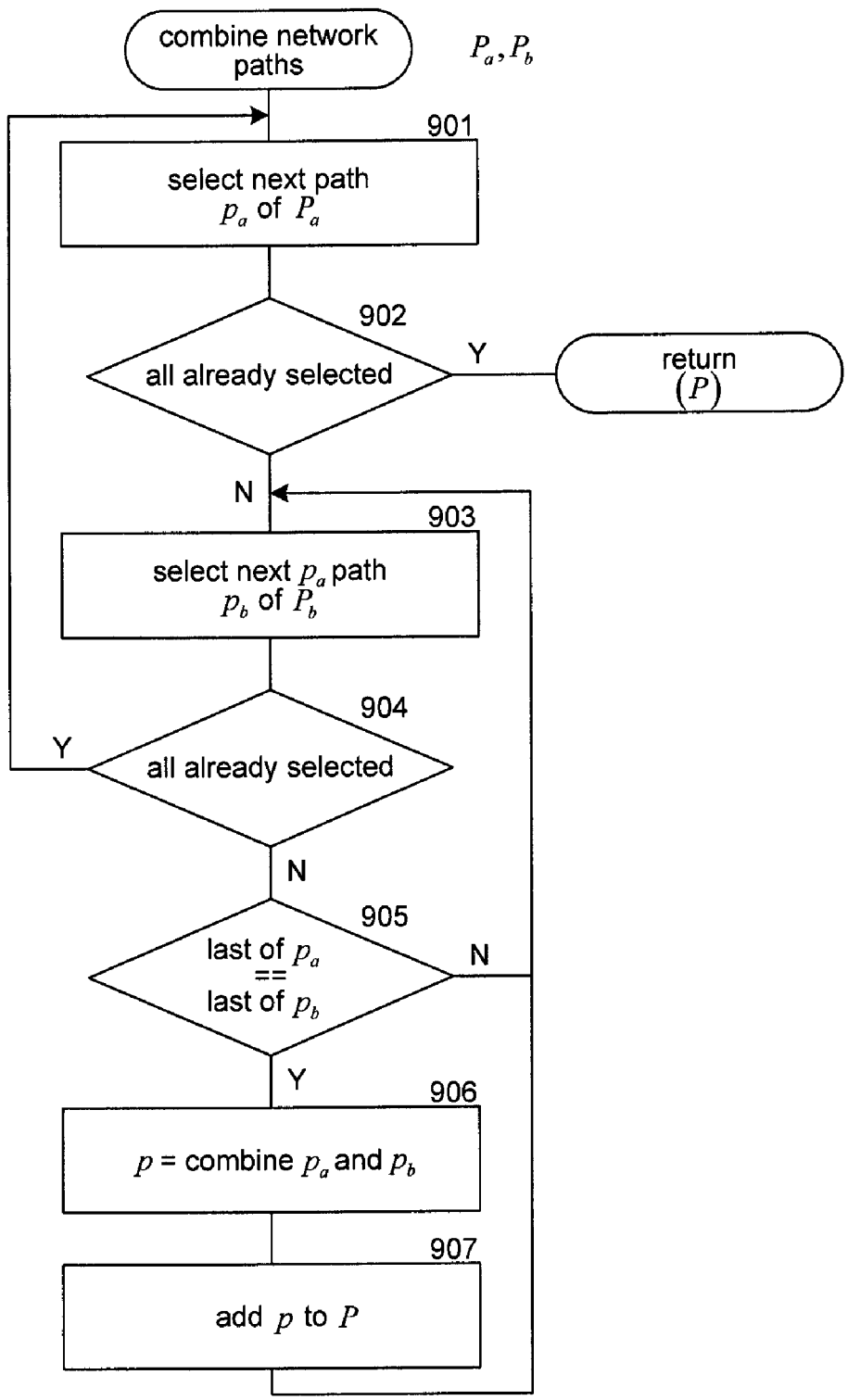
FIG. 9 is a flow diagram that illustrates the processing of a combine network paths component in some embodiments.

FIG. 9 is a flow diagram that illustrates the processing of a combine network paths component in some embodiments. The component is passed a collection of paths to common members from a first network and a second network. The component combines paths from the first network with paths of the second network based on the last members of the paths being the same. In block 901, the component selects a path of the first network. In decision block 902, if all the paths of the first network have already been selected, then the component returns a collection of the combined paths, else the component continues at block 903. In blocks 903-907, the component loops selecting the paths of the second network and combining those paths with the selected path of the first network as appropriate. In block 903, the component selects the next path of the second network. In decision block 904, if all the paths of the second network have already been selected, then the component loops to block 901 to select the next path of the first network, else the component continues at block 905. In decision block 905, if the last member of both selected paths is the same, then the component continues at block 906, else the component loops to block 903 to select the next path of the second network. In block 906, the component combines the selected paths. In block 907, the component adds the combined paths to the collection of combined paths and then loops to block 903 to select the next path of the second network.

Figure 10:
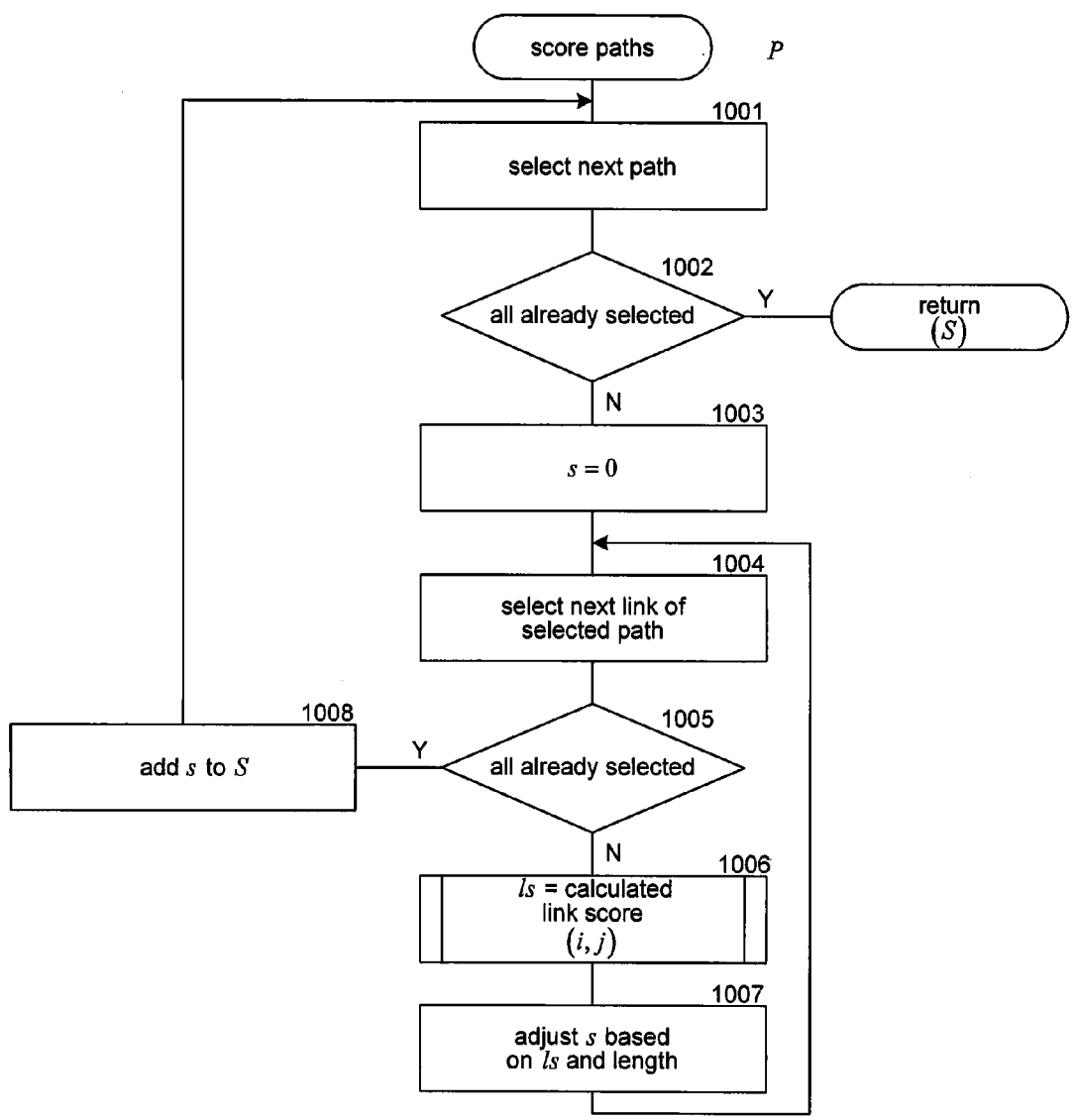
FIG. 10 is a flow diagram that illustrates the processing of a score paths component in some embodiments.

FIG. 10 is a flow diagram that illustrates the processing of a score paths component in some embodiments. The component is passed a collection of paths and generates a score for each path in the collection. In block 1001, the component selects the next path of the collection. In decision block 1002, if all the paths have already been selected, then the component returns the scores for the paths, else the component continues at block 1003. In block 1003, the component initializes a score for the selected path. In blocks 1004-1007, the component loops aggregating link scores into an overall path score for the path. In block 1004, the component selects the next link of the selected path starting with the first link. In decision block 1005, if all the links have already been selected, then the component continues at block 1008, else the component continues at block 1006. In block 1006, the component invokes the calculate link score component passing an indication of the link and receiving a score for the link in return. In block 1007, the component adjusts the path score for the path based on the link score and the length of the path. The component then loops to block 1004 to select the next link of the path. In block 1008, the component adds the path score to the collection of scores and then loops to block 1001 to select the next path of the collection.

Figure 11:
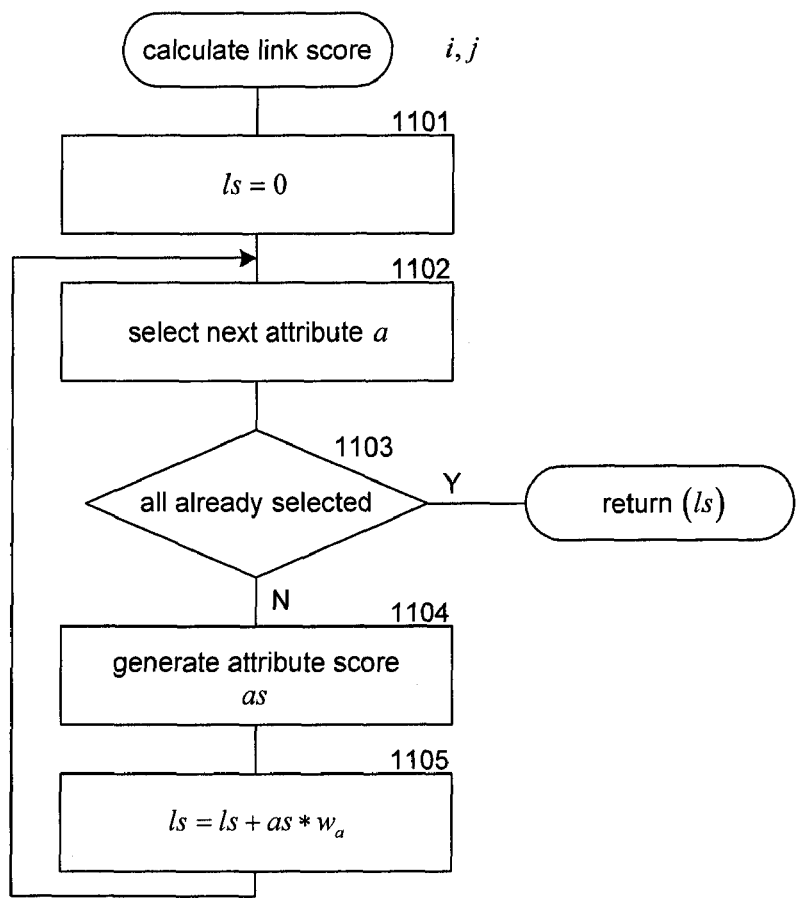
FIG. 11 is a flow diagram that illustrates the processing of a calculate link score component in some embodiments.

FIG. 11 is a flow diagram that illustrates the processing of a calculate link score component in some embodiments. The component is passed an indication of a link and returns a link score indicating the strength of the relationship between the members connected by the link. In block 1101, the component initializes the link score. In blocks 1102-1105, the component loops generating an attribute score for each attribute and aggregating the attribute scores for each attribute into the link score. In block 1102, the component selects the next attribute. In decision block 1103, if all the attributes have already been selected, then the component returns the link score, else the component continues at block 1104. In block 1104, the component generates an attribute score for the selected attribute of the linked members. In block 1105, the component aggregates the attribute score into the link score applying an appropriate weight to the attribute score. The component then loops to block 1102 to select the next attribute.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for identifying an intermediary for a relationship contact between a first member of a first network and a second member of a second network, the method comprising:

providing the first network of members, each member of the first network having a relationship with one or more other members of the first network, the first network represented as a first graph with nodes and links, each member of the first network represented as a node and the relationships represented as links between nodes, each member of the first network having attributes;

providing the second network of members, each member of the second network having a relationship with one or more other members of the second network, the second network represented as a second graph with nodes and links, each member of the second network represented as a node and the relationships represented as links between nodes, each member of the second network having attributes;

identifying by the computing device relationship paths between the first member of the first network and the second member of the second network by traversing the first graph and the second graph to identify paths that include a common member that is common to both the first network and the second network, the common member serving as a bridge between the first network and the second network;

generating an intermediary score for each identified relationship path, the intermediary score being derived from relationship scores for each link along an identified relationship path and a length of the relationship path, the relationship scores for a link being based on the attributes of the members connected by the link, the intermediary score indicating whether the identified relationship path includes an intermediary who can effect a successful introduction between the first member and the second member; and identifying as potential intermediaries the common members that serve as the bridge for the relationship paths whose generated intermediary scores indicate they can effect a successful introduction between the first member and the second member.

2. The method of claim 1 including receiving an indication of a scoring algorithm for generating the intermediary scores.

3. The method of claim 1 including receiving an indication of weights for the attributes for generating relationship scores.

4. The method of claim 1 wherein a network is generated from contact lists of the members of an organization.

5. The method of claim 1 wherein a network is provided by an enterprise resource planning system.

6. The method of claim 1 wherein the identifying of relationship paths includes:
   identifying common members of the first network and the second network;
   identifying first network paths of the first network between the first member and each common member;
   identifying second network paths of the second network between the second member and each common member; and
   combining into an inter-network path each first network path and each second network path that have end nodes that represent the same common member.

7. The method of claim 1 wherein the graphs are represented by a matrix with rows and columns representing nodes of the graph and elements of the matrix indicating the presence or absence of a link between the nodes represented by the elements.

8. The method of claim 1 wherein the attributes of a member include title within an organization, location information, and indications of affiliation with other organizations.

9. A computing device for identifying an intermediary for a relationship contact between a first member of a first network and a second member of a second network, comprising:
   a data store containing a representation of a plurality of networks, each network having members with relationships between the members;
   a memory storing computer-executable instructions of
      a component that identifies relationship paths between the first member of the first network and the second member of the second network, a relationship path representing a path of relationships between the first member and the second member that includes one or more members that are common to the first network and the second network and serve as a bridge between the first network and the second network;
      a component that generates an intermediary score for each identified relationship path, the intermediary score being derived from relationship scores for each relationship along an identified relationship path and a length of the identified relationship path, the relationship scores being based on the attributes of the members along an identified relationship path, the intermediary score indicating whether the identified relationship path includes an intermediary who can effect a successful introduction between the first member and the second member; and
      a component that identifies as potential intermediaries the common members that serve as a bridge for the relationship paths whose generated intermediary scores indicate they can effect a successful introduction between the first member and the second member; and
   a processor for executing the computer-executable instructions stored in the memory.

10. The computing device of claim 9 wherein a network is represented by a graph with nodes and links, each node representing a member of a network and each link representing a relationship between members.

11. The computing device of claim 9 including a component that receives an indication of a scoring algorithm for generating the intermediary scores.

12. The computing device of claim 9 including a component that receives an indication of weights for the attributes for generated relationship scores.

13. The computing device of claim 9 wherein a network is generated from contact lists of the members of an organization.

14. The computing device of claim 9 wherein a network is provided by an enterprise resource planning system.

15. The computing device of claim 9 wherein the component that identifies relationship paths includes:
   a component that identifies common members of the first network and the second network;
   a component that identifies first network paths of the first network between the first member and each common member;
   a component that identifies second network paths of the second network between the second member and each common member; and
   a component that combines into an inter-network path each first network path and each second network path that have path end members that represent the same common member.

16. A computer-readable storage device storing computer-executable instructions for identifying an intermediary for a relationship contact between a first member of a first network and a second member of a second network, by a method comprising:
   providing a data store with a representation of the first network and the second network, each network having members with relationships between the members;
   identifying relationship paths between the first member of the first network and the second member of the second network, a relationship path representing a path of relationships between the first member and the second member that includes a member that is common to the first network and the second network and serves as a bridge between the first network and the second network;

generating an intermediary score for each identified relationship path, the intermediary score being derived from relationship scores for each relationship along an identified relationship path, the relationship scores being based on the attributes of the members along an identified relationship path, the intermediary score indicating whether the identified relationship path includes an intermediary who can effect a successful introduction between the first member and the second member; and a component that identifies as potential intermediaries common members of the relationship paths whose generated intermediary scores indicate they can effect a successful introduction between the first member and the second member.

17. The computer-readable storage device of claim 16 wherein the first network represents a first organization and the second network represents a second organization and wherein the representation of the first network and the second network includes a first graph for the first network and a second graph for the second network, the first graph having first nodes representing employees of the first organization and contacts of the employees of the first organization and having first links between first nodes representing relationships between members represented by the first nodes, the second graph having second nodes representing employees of the second organization and contacts of the employees of the second organization and having second links between second nodes representing relationships between the members represented by the second nodes.

18. The computer-readable storage device of claim 17 wherein the intermediary score for an identified path is based on position of a member of the path within the first organization.

19. The computer-readable storage device of claim 16 wherein the first network and the second network are social networks.

20. The computer-readable storage device of claim 16 wherein the members of the first network and the second network are people.

* * * * *